R. GOOD.
MANUFACTURE OF GLASS.
APPLICATION FILED DEC. 1, 1919.

1,421,211.

Patented June 27, 1922.
3 SHEETS—SHEET 1.

Inventor:
Robert Good
by Clarence D. Kerr, Att'y.

Inventor
Robert Good
by Clarence D. Kerr Att'y

R. GOOD.
MANUFACTURE OF GLASS.
APPLICATION FILED DEC. 1, 1919.

1,421,211.  Patented June 27, 1922.
3 SHEETS—SHEET 3.

Inventor
Robert Good
by Clarence O'Kerr, Att'y.

UNITED STATES PATENT OFFICE.

ROBERT GOOD, OF WASHINGTON, PENNSYLVANIA, ASSIGNOR TO HAZEL ATLAS GLASS CO., A CORPORATION OF WEST VIRGINIA.

MANUFACTURE OF GLASS.

1,421,211.   Specification of Letters Patent.   Patented June 27, 1922.

Application filed December 1, 1919. Serial No. 341,733.

*To all whom it may concern:*

Be it known that I, ROBERT GOOD, a citizen of the United States, residing at Washington, Washington County, Pennsylvania, have invented new and useful Improvements in the Manufacture of Glass, of which the following is a specification, reference being had to the accompanying drawings, in which—

Figure 1:
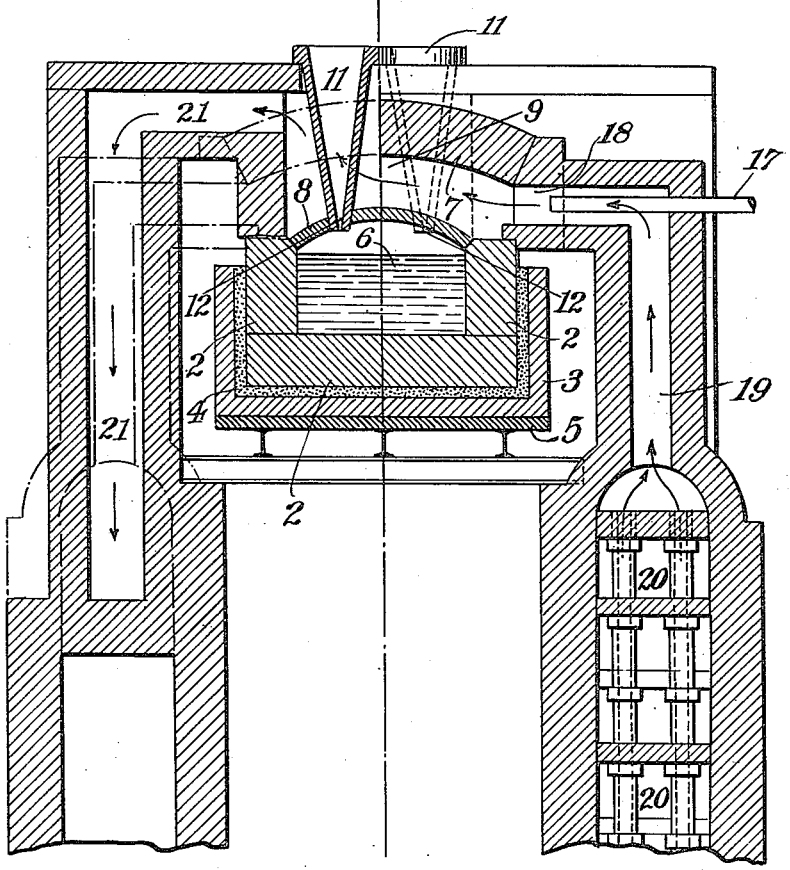
Figure 2:
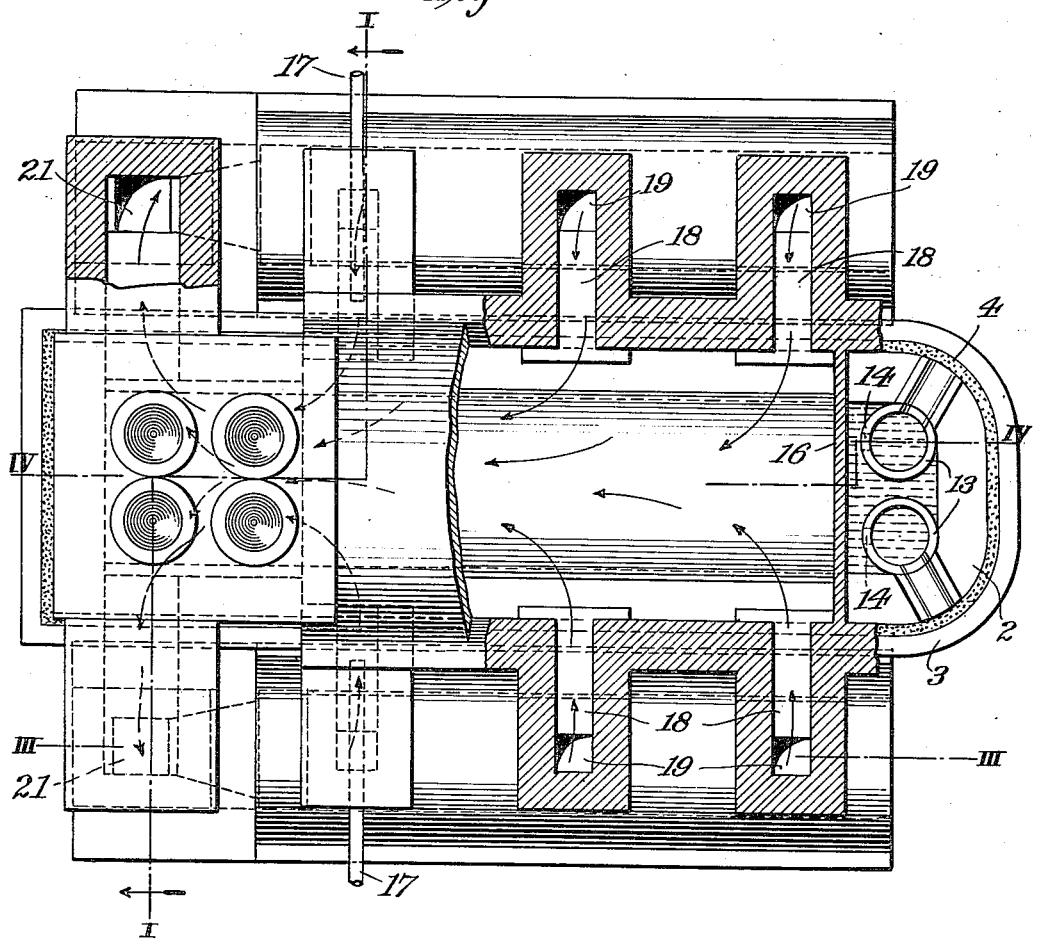
Figure 3:
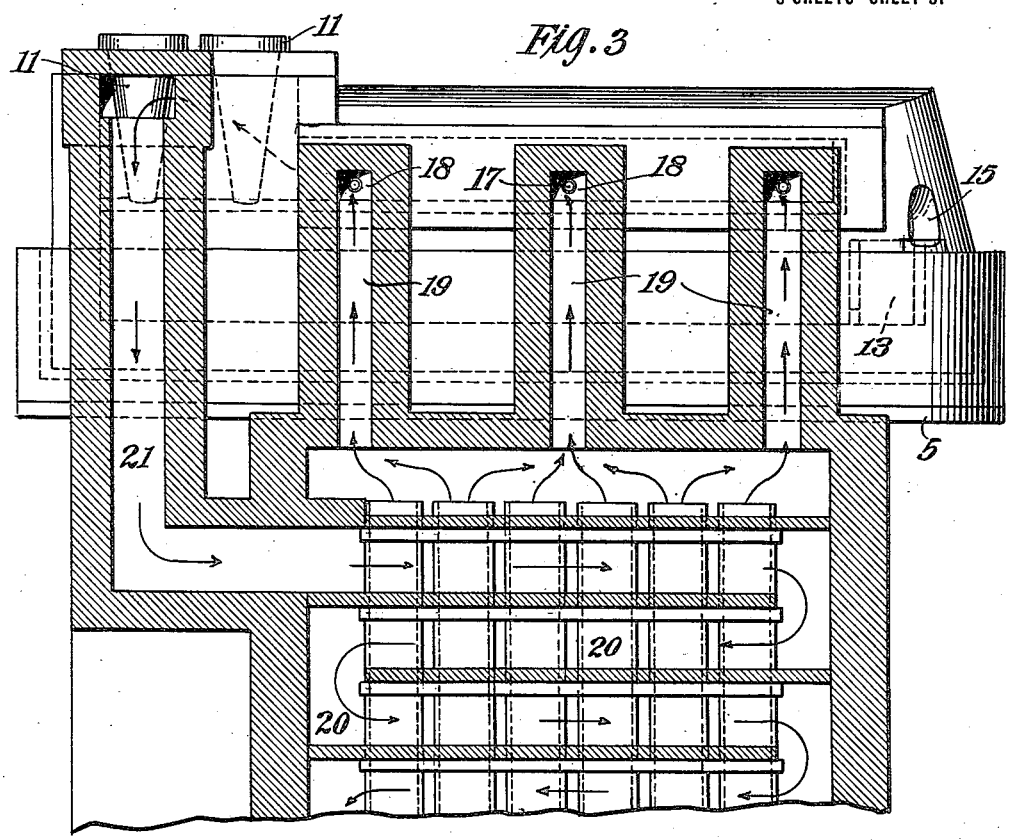
Figure 4:
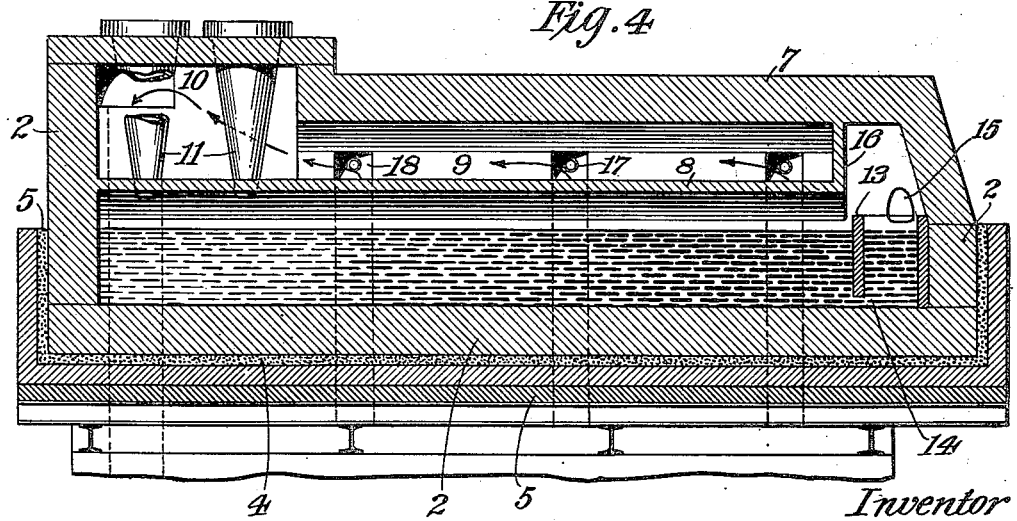

Fig. 1 is a section on line I—I of Fig. 2 of a furnace embodying my invention; Fig. 2 is a plan of my improved furnace with the roof partly broken away; Fig. 3 is a section on line III—III of Fig. 2; and Fig. 4 is a section on lines IV—IV of Fig. 2.

My invention relates to the manufacture of glass of the finer grades, such as are usually made in covered pots, and comprises the use and construction of a continuous tank so arranged that the glass making materials are melted without permitting the heating medium to come in contact with them. My invention also consists in the construction, co-operation of parts and in the use thereof, which I shall hereinafter describe and claim.

Referring to the drawings, 2 indicates the flux blocks forming the sides and bottom of the tank, which in order to prevent dissipation of the heat from the tank are contained within an insulation wall 3, and between the wall 3 and the blocks 2 is an insulation space 4, preferably filled with sand. The wall 3 may also be mounted on a course of brick to afford further protection against loss of heat from the tank. The body of molten and melting glass in the tank is indicated by the numeral 6, and the arch or crown of the tank by 7. At a distance beneath the arch 7 and supported on the side flux blocks 2 is arranged a cap or shield 8 of any highly refractory and conductive material, which extends over and covers the tank for its entire length, except for the space occupied by the working out cylinders 13 later referred to, and protects the material in the tank from the action of the flame in the combustion chamber 9, which lies immediately above the shield 8. In the enlarged end 10 of the combustion chamber 9 are arranged the fusion cones 11, the upper ends of which extend above the top of portion 10 of the combustion chamber and have their lower ends extend through apertures in the shield 8. Each cone 11 is provided with an orifice 12 in its lower and smaller end to permit the material when fused to flow into the body 6 of molten glass in the tank.

At the discharge end of the tank are arranged the working out cylinders 13, from which the molten glass is withdrawn to be worked. The molten glass enters the cylinders 13 through an aperture 14 in the rear wall of each cylinder, placed well below the upper surface of the molten glass, so that only refined glass, free from impurities, will flow into such cylinder. The numeral 15 indicates an opening in the furnace wall through which the glass may be withdrawn from the cylinders 13. A short distance to the rear of the cylinders 13 is a wall 16 which extends upward from the shield 8 to the arch or crown 7, forming the end of the combustion chamber 9, thereby shutting off the intense heat of the combustion chamber and permitting the radiation there through of just enough heat into the part of the furnace immediately over the working out cylinders 13 to keep the glass in the cylinders at a temperature suitable to the purposes of the glass worker. I prefer to make the fusion cone portion 10 of the combustion chamber 9 higher than the combustion chamber over the rest of the furnace, in order to accommodate larger fusion cones than could be otherwise used.

The heating medium is supplied to the combustion chamber 9 through the burners 17 for oil or gas in the fire ports 18, the air necessary for combustion being provided through the air passages 19 leading from the recuperators 20.

The products of combustion are led from the portion 10 of the combustion chamber through the flues 21, which lead down through the recuperators 20 and thence out the stack. The incoming air is heated in the recuperators 20 and then passes up through the air passages 19, as described above.

When the furnace which I have described is put into operation the gas or other fuel is introduced through the fire ports 18 suitably mixed with air, and combustion takes place in the combustion chamber 9, which is kept at a very high temperature, and as the draft ports or flue lead out of the extreme upper part of the fusion cone chamber 10 the most effective part of the flames is caused to circulate around the fusion cones 11, which are thus kept at a very high temperature. As the usual mixture of batch and cullet is fed regularly into the cones, it becomes fused by intimate contact with the heated walls of the cones, and when it reaches a sufficiently fluid state flows through the orifices 12 at the lower end of the cones into the body of molten and melting material in the tank.

The intense heat of the chamber 9 is conducted through the shield 8, which is as thin as is practicable, and is radiated on the surface of the body 6 of the molten glass, and raises the molten glass to the temperature necessary to cause the refining operation to take place.

As the refined or completely melted glass has a greater specific gravity than the remainder of the mass, it sinks to the bottom and the remainder of the material floats upon the top of the refined glass, so that those portions of the material in which the state of fusion is least advanced are always the portions most exposed to the heat radiated from the under side of the shield 8.

As the glass is gathered or otherwise removed from the cylinders 13, that which is removed is continually replaced by molten glass from the lower strata of refined glass in the tank, as it enters the cylinder 13 through the opening 14 from the bottom of the tank into the bottom of the cylinder.

The invention which I have described is of great advantage, since it renders it possible to obtain a regular, continuous, abundant and cheap supply of molten glass, suitable for the manufacture of the finer grades of glassware, and at the same time enables manufacturers to utilize their factory space continuously and economically.

The terms and expressions which I have employed are used as terms of description and not of limitation, and I have no intention, in the use of such terms and expressions, of excluding any equivalents of the features shown and described, or portions thereof, but recognize that various modifications are possible within the scope of the invention claimed.

What I claim is:

1. The method of continuously melting glass making material, which comprises melting the material in a vertically depending cone-shaped receptacle by heat out of contact with the material until it becomes semi-molten and flows into a tank, heating it in a tank by a heating medium out of contact with the material until it is thoroughly melted and refined and continuously presenting a supply of refined glass to be withdrawn from the tank for conversion into glassware.

2. In a glass melting furnace, a melting tank, a combustion chamber arranged immediately above the tank and arranged to heat the tank by convection, a cone shaped receptacle depending vertically in the combustion chamber communicating with the tank and by which material is supplied thereto, the receptacle being so arranged that by convection of heat through the walls of the receptacle the material becomes sufficiently molten to flow into the tank.

ROBERT GOOD.